United States Patent

Chronister

[15] 3,665,952

[45] May 30, 1972

[54] ELBOW VALVE

[72] Inventor: Clyde H. Chronister, Houston, Tex.

[73] Assignee: Chronister Valve Company, Inc., Houston, Tex.

[22] Filed: Feb. 12, 1971

[21] Appl. No.: 114,905

Related U.S. Application Data

[63] Continuation-in-part of Ser. No. 839,280, July 7, 1969, Pat. No. 3,665,952.

[52] U.S. Cl..................137/246, 137/625.11, 137/630.14
[51] Int. Cl..........................................................F16k 11/02
[58] Field of Search..............137/246, 584, 611, 612, 625.11, 137/630.14; 251/158, 159, 193, 329, 369

[56] References Cited

UNITED STATES PATENTS

| 845,244 | 2/1907 | Lorenz | 137/246 |
| 2,630,783 | 3/1953 | Reeve | 251/369 X |
| 3,563,509 | 2/1971 | Chronister | 251/159 |

Primary Examiner—M. Cary Nelson
Assistant Examiner—David R. Matthews
Attorney—James F. Weiler, Jefferson D. Giller, William A. Stout, Paul L. De Verter, II, Dudley R. Dobie, Jr. and Henry W. Hope

[57] ABSTRACT

A pipe elbow in a valve housing having first and second conduits extending therein with the elbow pivotally sealable to the first conduit and to a trunnion axially aligned with the first conduit whereby the elbow may be rotated to bring the second end into and out of alignment with the second conduit. Sealing means for closing off the second end of the elbow for equalizing pressure before opening the valve having a first member sealing against the elbow and having an opening therethrough with a second member positioned to extend into the opening and seal therein with a loss motion connection between the first and second members. The elbow being actuated by means connected to the trunnion and the trunnion including a load bearing type universal joint. The second end of the elbow and the second conduit having coacting bevels whereby the ends thereof may be closely spaced together to provide a through conduit valve. The seal means including a double block and bleed seal with a testing conduit. The housing being made of portions of conventional pipe and flat plate to provide an inexpensive yet sturdy valve.

16 Claims, 4 Drawing Figures

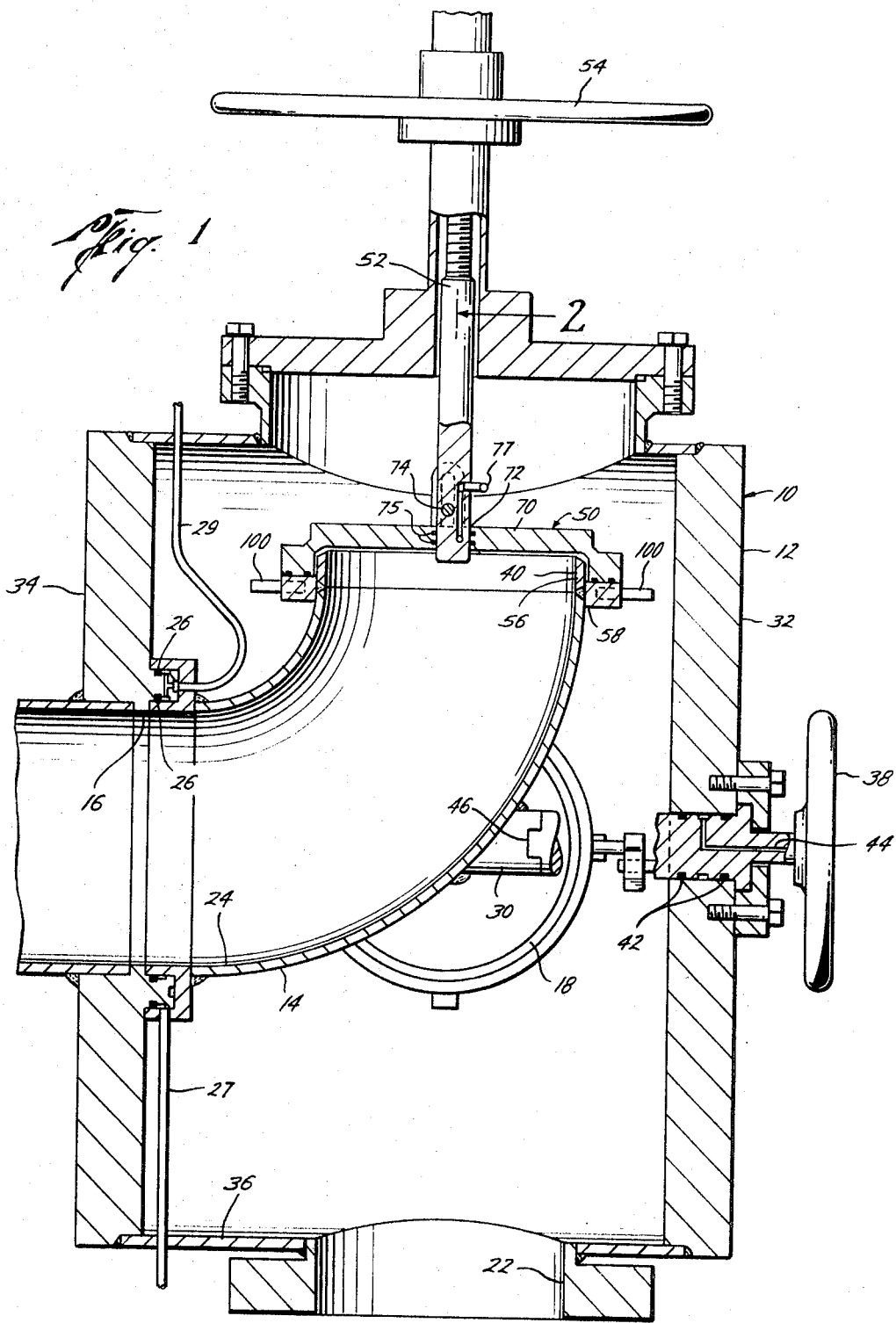

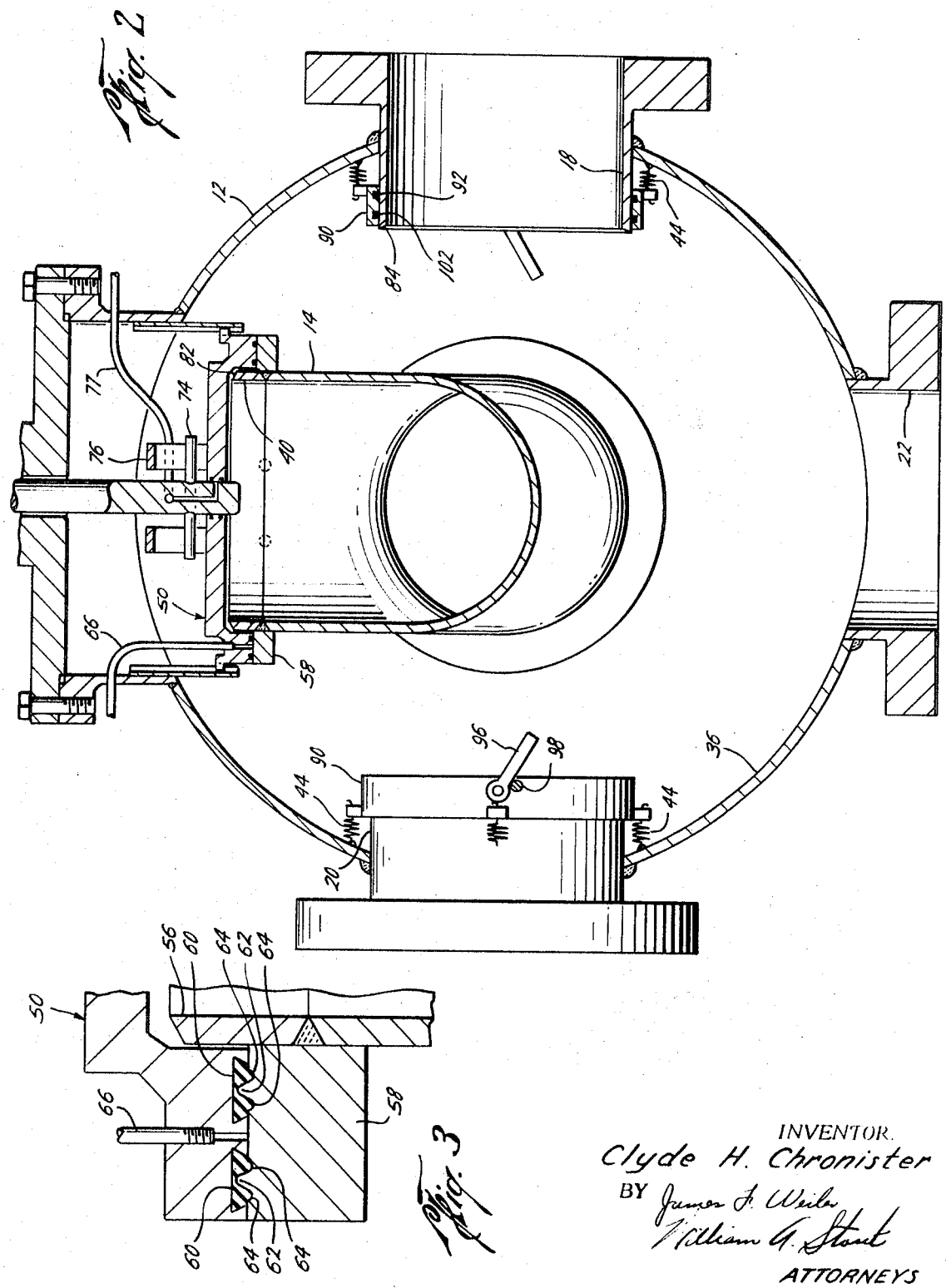

INVENTOR
Clyde H. Chronister
BY
ATTORNEYS

ELBOW VALVE

CROSS-REFERENCES TO RELATED APPLICATIONS

This application is a continuation-in-part of my copending application Ser. No. 839,280, filed July 7, 1969, now U.S. Pat. No. 3,563,509 issued Feb. 16, 1971.

BACKGROUND OF THE INVENTION

My copending U.S. Pat. No. 3,563,509 issued Feb. 16, 1971 discloses a simple and inexpensive valve which is particularly useful for controlling the low pressure flow of liquids and gases and utilizes a pipe bend such as a conventional elbow which can be rotated in a valve housing between an open and closed position. The present invention is directed to various improvements in such a valve.

SUMMARY

The present invention is directed to an elbow type valve which is of the through conduit type, that is, the valve passageway is equal in size to the line passageway and the space between the conduit and the elbow may be made extremely small by beveling the ends of the elbow and the coacting pipe with coacting tapers whereby equipment that is inserted into the conduit can pass through the valve.

A further object of the present invention is the provision of an elbow valve having double block and bleed seal means to allow the valve to flow fluid therethrough in either direction.

A still further feature of the present invention is the provision of a seal means having an internal bypass to equalize pressure before opening the valve by providing a first member sealing against the pipe bend and having an opening therethrough with a second member positioned to extend into the opening and seal therein with a loss motion means between the first and second members.

Still a further object of the present invention is the provision of operating the pipe bend from the trunnion and providing a load bearing type universal joint in the trunnion for easily aligning the trunnion with and disconnecting it from its drive mechanism.

Still a further feature of the present invention is the provision of a through conduit elbow valve which may be a multiport valve such as a three- or four-way valve.

Still a further feature of the present invention is the provision of an inexpensive valve which may be constructed of portions of pipe and flat plate whereby the valve may be sturdy but yet inexpensively and quickly manufactured.

Other and further features and advantages will be readily apparent from the following description of the preferred embodiment.

BRIEF DESCRIPTION OF THE DRAWINGS

FIG. 1 is an elevational view, partly in cross section, illustrating the preferred embodiment of the present invention as a four-way valve with the valve in the closed position, FIG. 2 is a cross-sectional view taken along the line 2—2 of FIG. 1, FIG. 3 is an enlarged fragmentary cross-sectional view of the seal means for closing the valve.

DESCRIPTION OF THE PREFERRED EMBODIMENT

Figure 4:
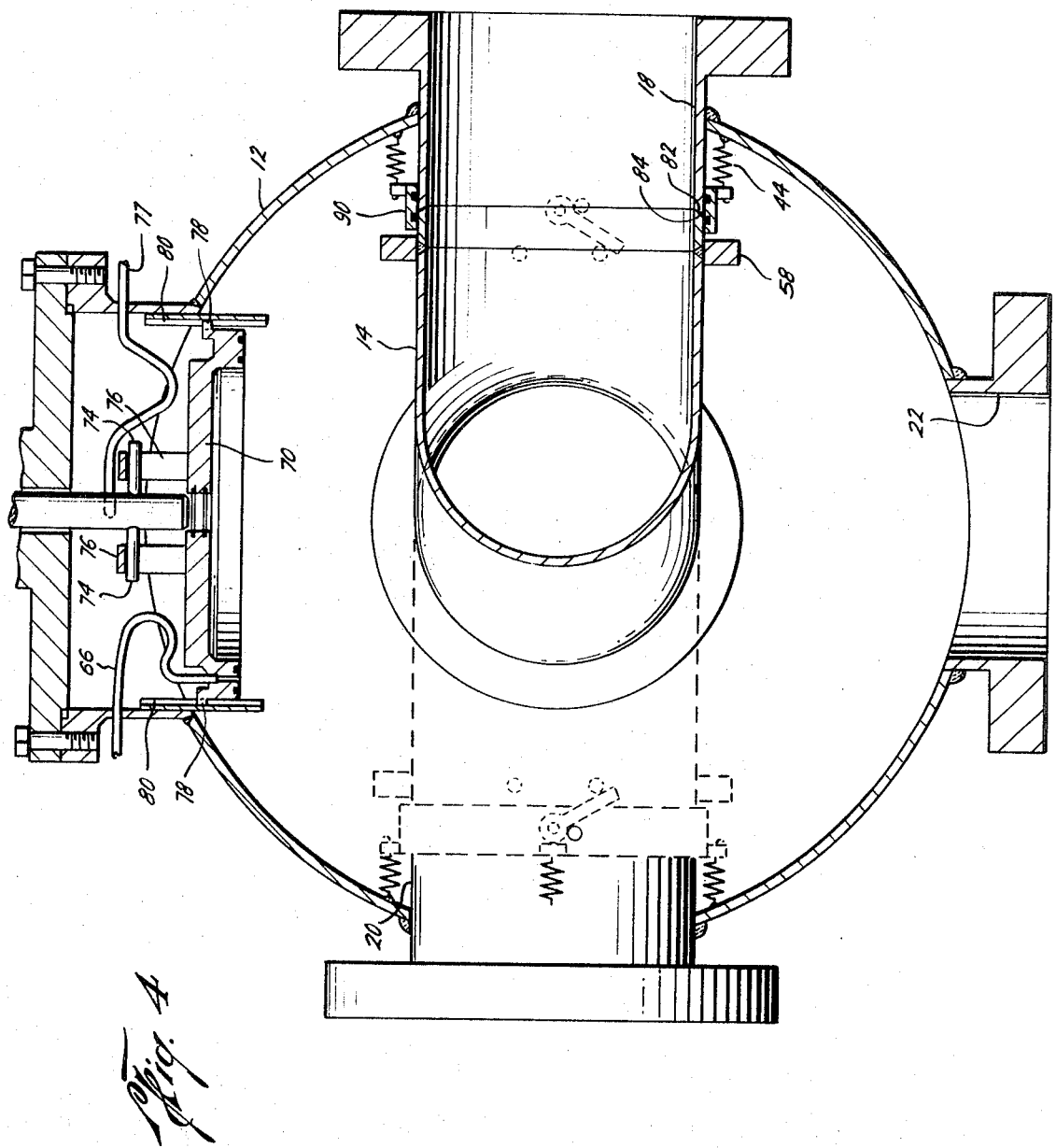
FIG. 4 is a cross-sectional elevational view of the valve of FIG. 1 with the valve in the open position.

Referring now to the drawings, and particularly to FIGS. 1, 2 and 4, the reference numeral 10 generally indicates the valve of the present invention and includes a housing 12 and a pipe bend 14 such as an elbow.

The housing 12 may include two or more openings, here shown as four in order to provide a four-way valve. In this embodiment, the housing includes first, second and third conduits 16, 18 and 20 extending into the housing 12 and the fourth conduit 22 merely connected to the housing 12 to provide an opening thereto. The pipe bend 14, preferably a pipe elbow, has a first end 24 which is aligned with the conduit 16 and is rotatable in the housing and sealed therein by a suitable seal such as O-rings 26 so as to be sealingly connected to the conduit 16. A line 27 may be provided leading to a point exteriorly of the housing for providing a sealing lubricant to the rotatable connection. While line 27 may be used for testing the seals 26 for leakage, a separate line 29 may be provided for that purpose if desired. Of course, one or more of the conduits 18, 20 and 22, may be omitted if desired to provide a three-way or two-way valve instead of the four-way valve shown herein.

Elbow 14 is further supported in the housing 12 by a trunnion 30 (FIG. 1) which in turn is supported through a wall 32 of the housing 12. Preferably, the wall 32 is made of plate and a second wall 34 of the housing 12 supports the conduit 16 and the pivoting end 24 of the elbow 14 thereby providing an inexpensive but suitable support for the rotating elbow 14. Another portion 36 of the housing 12 is preferably made from a section of pipe whereby the valve housing 12 may be sturdy, but yet inexpensive and easy to manufacture. Preferably, the elbow 14 is rotated by the trunnion which in turn is connected to suitable means such as a hand wheel 38 for rotating the second end 40 of the elbow 14 to bring the second end 40 into and out of alignment with conduits 18 and 20 and a closed position. The trunnion 30 is suitably sealed as a passage through the wall 32 by seals such as O-rings 42. A passageway 44 is provided in the trunnion 30 communicating between the seals 42 and exteriorly of the housing 12 to provide a sealing lubricant between the trunnion 30 and the wall 32 for lubrication and for assisting in sealing. Preferably, the trunnion 30 includes a load bearing type universal joint 46 which aids in assembling the elbow 14 in the valve housing as well as compensating for any misalignment between the trunnion connection to the elbow 14 and the opening in the walls 32 which receives the end of the trunnion 30.

The elbow 14 thus may be rotated between a closed position as shown in FIGS. 1 and 2 wherein the second end 40 may be closed by a seal means generally indicated by the numeral 50 or may be aligned with one of the conduits 18 and 20, as best seen in FIG. 4, in which the valve 10 is in the open position.

The seal means 50 for moving into engagement with the second end 40 of the elbow 14 for sealing said second end, is moved towards and away from the second end 40 of the elbow by any suitable means such as a conventional actuating stem 52 controlled by hand wheel 54. Preferably, the second end 40 of the elbow 14 includes a straight section 56 for allowing the seal means 50 to telescopically enclose said section 56, and preferably an abutment ring 58 is connected to the exterior of the second end 40 of the elbow 14. As best seen in FIG. 3, the sealing member 50 includes seal means, preferably two seals 60 spaced apart which coact and seal against the abutment 58 to provide the necessary seals for sealing off the second end 40 of the elbow 14 when the seal means 50 is moved in and against the second end of the elbow 14. Preferably, the abutment 58 includes a ridge 62 for engagement with each of the seals 60 with valleys 64 on either side of the ridges 62 so that when the ridges 62 engage the seals 60 the seals 60 will be deformed around the ridges 62 and into the valleys 64 to provide a tight seal. In addition, a passageway 66 may be provided in the seal means 50 and between the seals 60 and extending to a point exteriorly of the housing for either testing whether the seals are suitably holding or for the purpose of providing a sealing lubricant thereto to increase the sealing.

Of course, if conduit 16 is the inlet conduit, there would be no difficulties in opening the sealing means 50 by means of the wheel 54 and stem 52. In some uses, however, one of the other conduit 18 and 20 may be the inlet conduit, particularly in a two- or three-way valve, and in that event the incoming fluid pressure would be acting against the back of the sealing means 50 tending to increase the sealing force of the seals 60, but which would also make it more difficult to move the sealing means 50 away from the second end 40 of the elbow 14. In this use, it is desirable to equalize the pressure on either side of the sealing means 50 at the time of opening. Thus, the sealing means 50 may include the first member 70 having an opening 72 therein into which the stem 52 extends to form a second sealing member therein such as by means of O-ring seals 75. Thus lower torque may be used to raise the stem 52 from the opening 72 until the stem 52 clears the opening thereby equalizing pressure on either side of the first member 70. A lost motion connection is provided between the stem 52 and the first member 70 by means of a pin 74 which when in the fully closed position act against the back of the first member 70 to seal the first member against the end of the elbow 40. However, the pin 74 moves in a lost motion connection 76 to allow the stem 52 to move out of the opening 72 and equalize the pressure before the pins 74 engage the lost motion connection 76 to move the first member 70 away from the elbow 14. As best seen in FIGS. 2 and 4, guide means are provided between the housing 12 and the first member 70 such as a tongue 78 and guide track 80 for keeping the first member 70 in alignment with the second end 40 of he elbow 14. Also a passageway 77 is provided in the stem 52 leading from a point between seals 72, when the sealing means 50 is closed, to a point exteriorly of the housing 12 for testing the seals 74 or for supplying a sealing lubricant thereto.

In order to provide a through conduit valve, that is one in which the valve cross-sectional area is as great as the cross-sectional area of the line which it is placed it is also necessary that the opening between the ends of the conduits 18 and 20 and the end 40 of pipe elbow 14 is small. Of course, the first end 24 of the elbow 14 abuts the wall 34 and the conduit 16 and thus satisfies this condition. The second end 40 of the elbow 14 is of the same interior cross section as the conduits 18 and 20. Therefore, in order to satisfy the test condition of a through conduit valve, the distance between the end 40 of the elbow 14 and the inside ends of the conduits 18 and 20 must be small. This is accomplished by placing an outside bevel 82 on the interior ends of the conduits 18 and 20. The bevels 82 and 84 while spaced a slight distance apart, will be generally positioned on a sphere having its center at the intersection of the axis of conduits 16, 18 and 20.

Suitable seal means may be provided to provide a seal across the tapered ends 82 and 84 when the second end 40 of the elbow 14 is aligned with one of the conduits 18 and 20. Thus, as more fully described in my copending U.S. Pat. No. 3,563,509, a collar 90 is longitudinally slidable with each of the conduits 18 and 20 and is sealed therewith such as by an O-ring 92. A plurality of springs 44 may be provided, one end of which is connected to the sleeve 90 and the other end of which is connected to the housing 12 for yieldably pulling the collars 90 away from the ends of the conduit 18 and 20. In order to move the collars 40 toward the ends of the conduits 18 or 20 and seal there with the second end 40 of the elbow 14, a latching arm 96 may be provided on either side of the sleeve 90 and are normally held in an outwardly extending position by pins 98 attached to and extending from the housing 12. Actuating pins 100 are provided on either side of the elbow end 40 where they will engage the arms 96 as the elbow is rotated and the end 40 move into alignment with one of the ends of the conduits 18 or 20. Movement of the pin 100 against the arms 96 will rotate the arm 96 about the pins 98 to move the collar 90 into a sealing engagement with the end 40 of the elbow 14 by suitable sealing means such as O-ring 102. By the use of the sealing collar 90, the closing seals 60 and 75 may be changed with the elbow end 40 in position aligned with either of the conduits 18 and 20 under full service conditions.

In use, FIG. 1 shows the valve 10 in the closed position whereby any liquor or gas coming through conduits 18, 20 or 22 fill up the interior of the housing 12, but are prevented from entering the elbow 14 and flowing out conduit 16 by the sealing means 50. If conduit 16 is in the inlet, any liquid or gas flowing therein is prevented from entering the housing 12 and leaving by way of conduits 18, 20 or 22. Of course, if the fluid is entering the conduit 16 the valve 10 may be opened by merely actuating the wheel 54 retracting the stem 52 and the pressure on the elbow side of the sealing means 50 will quickly retract the sealing means 50. If the fluid is entering through conduits 18, 20 or 22 and is therefore pressing against the back of the first member 70 acting to hold the sealing means 50 in the sealed position, retraction of the stem 52 will allow the stem to retract from the opening 72 in the first member 70 to provide a fluid bypass to equalize the pressure on either side of member 70. Thereafter further retraction of the stem 52 will cause the pin 74 to contact the lost motion connection 76 and easily retract the first member 70.

Thereafter, wheel 38 may be rotated to actuate the trunnion 30 and elbow 14 to move the second end 40 into alignment with one of the conduits 18, and 20 as desired. The collar 90 normally held out of the path of travel of the pipe end 40 by the action of the spring 44 and therefore the pipe end 40 may be moved into alignment with the ends of the conduits 18 or 20. As the elbow 14 is rotated into alignment, the pins 100 on the elbow 14 engage the actuating levers 96 rotating the arm 96 about the pins 98 to move the collar 90 into sealing engagement with the pipe end 40 to place the valve 10 in an open position.

The present invention, therefore, is well adapted to carry out the objects and attain the ends and advantages mentioned as well as others inherent therein.

What is claimed is:

1. A valve comprising,
    a housing having first and second conduits extending therein,
    a pipe bend in said housing having first and second ends, the first end thereof being pivotally sealable to the first conduit,
    a trunnion connected to the exterior of the bend and axially aligned with the first conduit whereby the bend may be rotated about the trunnion and first end,
    actuating means connected to the bend for rotating the bend about the trunnion and the first end for aligning the second end of the pipe bend with the second conduit and for moving the second end out of alignment with the second conduit into a second position,
    sealing means for closing off the second end when the second end is in the second position, said sealing means including a first member sealing against the second end of the bend, said first member having an opening therethrough, a second member positioned to extend into the opening and seal therein, seal actuating means connected to the second member and extending externally of the housing, and lost motion means between the first and second members.

2. The apparatus of claim 1 wherein the first member includes,
    an enclosure for telescoping about the second end of the pipe bend, said second end of the pipe bend being straight to allow telescoping of said enclosure,
    an abutment around the second end of the pipe bend, and
    seal means on one of the enclosure and the abutment for sealing the second end of the pipe bend with the enclosure is moved against the abutment.

3. The apparatus of claim 2 wherein the seal means includes a resilient seal on one of the enclosure and abutment, and
    a ridge on the other of the enclosure and abutment for coacting against the resilient seal.

4. The apparatus of claim 2 wherein the seal means include two spaced resilient seals on one of the enclosure and abutment,
    two spaced ridges on the other of the enclosure and abutment for coacting against the resilient seals, and
    a passageway between the seals leading exteriorly of the housing.

5. The apparatus of claim 1 wherein, actuating means is connected to the trunnion and extending exteriorly of the housing.

6. The apparatus of claim 5 wherein the trunnion includes a load bearing universal joint.

7. The apparatus of claim 1 wherein, the second end of the pipe bend is tapered outwardly, and the inward end of the second conduit is tapered inwardly, said taper being positioned generally on a sphere having its center at the intersection of the axis of the first and second conduits.

8. The apparatus of claim 1 including, guide means between the housing and the first member for insuring that the first member will align with the second end of the bend.

9. The apparatus of claim 1 including, a third conduit extending into the housing and positioned for alignment with the second end of the pipe bend when the bend is rotated to a third position to provide a three-way valve, and further sealing means for sealing the second end of the pipe bend with each of the second and third conduits.

10. The apparatus of claim 9 wherein, said actuating means is connected to the trunnion and extends exteriorly of the housing.

11. The apparatus of claim 10 wherein, the trunnion includes a load bearing universal joint.

12. The apparatus of claim 10 wherein, the housing body includes a portion of pipe, and two flat plates, one of said plates supporting the trunnion, and the second of the plates supporting the first conduit.

13. A valve comprising, a housing having first and second conduits extending therein, a pipe bend in said housing having first and second ends, the first end thereof being pivotally sealable to the first conduit, a trunnion connected to the exterior of the bend and axially aligned with the first conduit whereby the bend may be rotated about the trunnion and the first end, actuating means connected to the bend for rotating the bend about the trunnion and the first end for aligning the second end of the pipe bend with the second conduit and for moving the second end out of alignment with the second conduit in a second position, the second end of the pipe bend is tapered outwardly, the inward end of the second conduit is tapered inwardly, and both of said tapers being spaced adjacent each other and positioned generally on a sphere having its center at the intersection of the axis of the first and second conduits, and sealing means for closing off the second end when the second end of the pipe is in the second position.

14. The apparatus of claim 13 including, a third conduit extending into the housing and positioned for alignment with the second end of the pipe bend when the bend is rotated to a third position to provide a three-way valve, further seal means for sealing the second end of the pipe bend with each of the second and third conduits.

15. A valve comprising, a housing having a first and second conduits extending therein, a pipe bend in said housing having first and second ends, the first end thereof being pivotally sealable to the first conduit, a trunnion connected to the exterior of the bend and axially aligned with the first conduit whereby the bend may be rotated about the trunnion and the first end, actuating means connected to the trunnion and extending exteriorly of the housing for rotating the bend about the trunnion and the first end for aligning the second end of the pipe bend with the second conduit and for moving the second end out of alignment with the second conduit into a second position, and sealing means for closing off the second end of the pipe when the second end of the pipe is in the second position.

16. The apparatus of claim 15 wherein the trunnion includes a load bearing universal joint.

* * * * *